3,086,926
METHOD OF DISSOLVING REFRACTORY ALLOYS

Dennis M. Helton, Clinton, and Jouko E. Savolainen, Oak Ridge, Tenn., assignors to the United States of America as represented by the United States Atomic Energy Commission
No Drawing. Filed July 28, 1961, Ser. No. 127,749
7 Claims. (Cl. 204—1.5)

Our invention relates to the dissolution of refractory alloys and more particularly to the dissolution of nuclear reactor fuel material.

One of the requirements for economical operation of heterogeneous nuclear reactors is the availability of suitable methods for the reprocessing of spent fuel elements in order to recover fissionable and fertile materials and to remove fission products and other neutron poisons. Reprocessing is effected by dissolving the fuel elements generally in an acidic aqueous solution, and subjecting the resulting solution to chemical processes such as solvent extraction, by means of which the various dissolved materials are separately recovered. Processes now available for the reprocessing of irradiated fuel elements are described in Book 1, TID–7534, "Symposium on the Reprocessing of Irradiated Fuels," Brussels, Belgium, May 20–25, 1957. In these processes the dissolution of some types of fuel-element material, such as uranium-aluminum fuel alloys or aluminum-clad uranium, has presented few difficulties, since these materials dissolve readily in catalyzed mineral acids. However, other fuel element and cladding alloys have been developed to better withstand severe operating conditions, and these alloys have proven resistant to ordinary dissolution procedures. Among the latter category of alloys are zirconium-base cladding alloys containing minor proportions of tin, iron, chromium, and nickel referred to as "Zircaloys," and fuel element alloys comprising various combinations of uranium with zirconium, niobium and molybdenum. Dissolution of these alloys has required the use of fluorides in such form as ammonium fluoride or hydrofluoric acid, or high temperature reactions, e.g., hydrochlorination at temperatures over 400° C. in molten salt or gas medium. Various embodiments of these methods are described in the paper, "Dissolution and Feed Preparation for Aqueous Radiochemical Separation Processes," by F. L. Culler and R. E. Blanco, Second United Nations International Conference on the Peaceful Uses of Atomic Energy, Paper Number 1930. In these methods, both the use of fluorides and high temperatures present a serious disadvantage in their excessive corrosiveness. The use of fluorides for the dissolution of irradiated zirconium-bearing fuel alloys presents another disadvantage in that the presence of fluorides in the nitrate solution preferred as feed for these separation processes renders zirconium organic-insoluble. Zirconium is thus not extracted into the organic phase along with uranium in the radiochemical separation processes, but remains in the aqueous fission-product solution. Further processing, which produces excessive volumes of highly radio-active solution, is then required to recover the zirconium.

Dissolution of these alloys has also been effected by means of an anhydrous solution of hydrochloric acid in alcohol. The alcohol solution thus obtained is converted to an acidic aqueous solution, and any insoluble precipitates are separated from the solution. The use of an alcohol-hydrochloric acid solution, however, has proved impractical because of the loss of uranium to insoluble precipitates which are formed in the presence of water produced by a side reaction of the alcohol with the hydrochloric acid. For niobium-bearing alloys additional excessive uranium losses have been encountered due to the carrying of uranium in the niobium precipitate which forms upon conversion of the solution to the nitrate form.

It is, therefore, an object of our invention to provide a method of dissolving refractory alloys comprised chiefly of at least one metal selected from the group of zirconium, uranium, molybdenum, niobium, and thorium.

Another object is to provide a method of converting said alloys into dissolved form in an acidic aqueous solution.

Another object is to provide a method of removing from said acidic aqueous solution any insoluble material formed during said dissolution.

Another object is to provide a method of converting irradiated, zirconium-bearing nuclear reactor fuel elements into dissolved form in an acidic aqueous solution.

Another object is to provide a method of converting said alloys into dissolved form in an aqueous nitrate solution in which uranium losses are minimized.

Other objects and advantages of our invention will be apparent from the following detailed description.

In accordance with our invention, refractory alloys comprising a major portion of at least one metal selected from the group consisting of zirconium, uranium, molybdenum, niobium, and thorium may be dissolved by contacting the alloy with an anhydrous solution of mercuric chloride in a low-molecular-weight alcohol. The resulting alcohol slurry is then converted to an aqueous slurry and the aqueous slurry is electrolyzed to remove the insoluble mercury-containing particles formed by side reactions in the dissolution step. This dissolution method is particularly applicable to zirconium-base alloys of the type employed for cladding nuclear reactor fuel elements and to fuel alloys of uranium with zirconium, niobium, and molybdenum. Effective dissolution rates are obtained with a less corrosive medium than those previously employed, and uranium losses are minimized. The chloride-containing solution obtained by this method may be readily converted to a nitrate solution suitable as feed for radiochemical separation processes. Since the solution is free of fluorides, zirconium may be extracted along with the uranium in these processes, thus facilitating zirconium recovery and decreasing the volume of radioactive solution produced in processing irradiated material.

The reaction of refractory alloy constituents with mercuric chloride in alcohol is illustrated by the following reaction, postulated for zirconium:

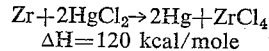

$$\Delta H = 120 \text{ kcal/mole}$$

The heat reaction from this exothermic reaction is removed by the vapor of boiling alcohol, and the temperature is thus maintained constant at the alcohol boiling point, 80° C. for ethanol. Other reactions, which produce insoluble mercurous chlorides, are illustrated by the following equations:

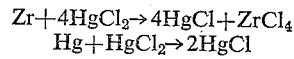

The metallic mercury produced in the solution forms small globules which are coated by the insoluble mercurous chloride and dispersed as a slurry. The slurry is then converted to an aqueous system and electrolyzed to remove the mercury values.

Our invention is primarily applicable to the dissolution of refractory alloys comprised chiefly of metals selected from the group of zirconium, niobium, molybdenum, uranium, and thorium, although it is not to be understood as so limited. Other alloy constituents such as tin and aluminum whose chlorides are soluble in alcohol are also dissolved by this means. It is to be understood that neither the relative proportions of the above-listed alloy constituents nor the number of these constituents in a particular alloy are at all critical. Alloys containing major proportions of iron, chromium, or nickel, e.g., stainless steels, are not effectively dissolved by this means. However, alloys containing minor proportions, i.e., up to approximately one percent, of these constituents and, in particular, the zirconium-base alloys described above and referred to as Zircaloys are dissolved by the method of our invention. This method is also applicable to the removal of cladding comprised of these alloys from uranium dioxide nuclear reactor fuel. For this material the cladding is dissolved, but the uranium dioxide is not affected by the solution.

The alcohol solvent employed in this invention must be anhydrous since the presence of water causes the formation of a uranium-containing precipitate, thus increasing uranium losses in the processing of fuel-element alloys. Although any low-molecular-weight anhydrous monohydric alcohol may be employed, methanol and absolute ethanol are preferred because of their higher reactivity in the process, lower cost and low boiling points which enable these alcohols to be easily removed by boiling upon conversion to an aqueous system. The term "low-molecular-weight anhydrous monohydric alcohol" as used in this specification and claims appended hereto is meant to encompass any anhydrous monohydric alcohol with a molecular weight up to and including that of butyl alcohol. We have found that reactivity of the mercuric chloride-alcohol solution with respect to the alloys described above decreases with increasing molecular weight of the alcohol. For this reason and as a result of the more difficult separation from water because of their higher boiling points, alcohols with higher molecular weights are ineffective. The volume of solution required may be kept to a minimum by employing a mixture comprising 80 percent by weight methanol and the balance absolute ethanol. Mercuric chloride is more soluble in this mixture than in either of the separate constituents, this mixture containing approximately 60 grams of mercuric chloride per 100 grams of solution at saturation at 25° C. Although not critical, it is preferred to use a concentration of mercuric chloride slightly less than the saturation concentration at 25° C. for the particular solvent involved.

Dissolution may be effected by contacting the alloy with the mercuric chloride-alcohol solution, the method of contacting the reagents not being critical to our invention. It is preferred, however, to suspend the alloy in the solution by any suitable means such as a basket resistant to the solution in order to prevent the settling of insoluble side-reaction products on the alloy and the resulting decreased reaction rate. As pointed out above, the heat of reaction causes vaporization of the alcohol during dissolution. Accordingly, the vessel employed for dissolution is preferably provided with a conventional reflux condenser to return the alcohol to the solution.

The product obtained in the dissolution step is an alcohol slurry, the alloy values being in solution and small globules of mercury coated with insoluble mercurous chloride being suspended in the alcohol. In order to provide an aqueous solution both the alcohol and the insoluble material must be separated from the alloy values. Removal of the alcohol may be readily effected by merely adding water and distilling off the alcohol. Although not critical, it is preferred to add water in the form of steam, thus quickly driving off the alcohol.

Removal of the mercury and mercurous chloride is then effected by electrolyzing the aqueous mixture obtained upon removal of the alcohol. By means of electrolysis, the mercury in the form of metal and mercurous chloride is completely converted to a continuous metallic phase and may be readily separated from the solution by decantation. Electrolysis is carried out in a cell provided with a mercury pool cathode at the bottom and an anode, preferably comprised of platinum or a platinum-iridium alloy, suspended in the electrolyte. Upon application of direct current to the cell, the emulsified mercury and the mercury in the mercurous state are oxidized to the soluble mercuric state. As the mercury becomes completely oxidized the anode evolves a mixture of oxygen and chlorine gases, and mercuric ions are reduced to metal and deposited at the cathode. When the deposition of mercury approaches completion, reduction of hydrogen occurs at the cathode and this gas is likewise evolved. However, if the solution contains substantial amounts of uranyl ions, these ions will be reduced to the tetravalent form as evidenced by a distinct change in solution color from yellow to green and hydrogen evolution is lessened. Although not critical, it is preferred to maintain the current density at a level below that at which appreciable amounts of hydrogen are evolved and to decrease the current density in removing the last traces of mercuric ion from the cell. Agitation of the electrolyte, preferably by means of a conventional mechanical agitator, is required to prevent the insoluble particles from settling on the cathode and forming an insulating layer. The speed of agitation, however, must not be great enough to disperse the liquid mercury cathode into the electrolyte, since the dispersed mercury would be re-emulsified. The desired agitation speed may be obtained by visually observing the electrolyte and making adjustments to avoid either of these conditions. Separation of the deposited mercury from the electrolyte may be readily accomplished by decantation. We have found that in the processing of irradiated fuel element alloys a minor proportion, e.g., one percent, of the fission product activity is contained in the mercury. The presence of this activity, however, presents little difficulty since the mercury may be re-converted to mercuric chloride and recycled as explained below. This activity is thus contained within the process system.

In order to provide an overall economical process the mercury may be re-converted to mercuric chloride by reacting the mercury with chlorine and recycled as feed for the dissolution step. This reaction is carried out by agitating a mixture of mercury and water and introducing gaseous chlorine into the system. Soluble mercuric chloride is formed with the evolution of heat. Since the solubility of mercuric chloride increases rapidly with the temperature, the mercuric chloride may be readily recovered from the solution by means of crystallization upon cooling. A rapid reaction rate may be obtained by mechanically agitating the reactants to increase the reacting surface of the mercury and to increase the rate of absorption of the chlorine gas. The conversion of mercury to mercuric chloride may be further improved by employing the mother liquor resulting from the initial crystallization as the medium for subsequent mercury-chlorine reactions. Upon addition of mercury to the mother liquor, mercurous chloride is formed by the reaction of mercury and mercuric chloride. The mercurous chloride aids in dispersing the mercury and in stabilizing the reacting surface. Mercurous chloride reacts with chlorine to form mercuric chloride in the same manner as mercury. The mercuric chloride is then recovered by crystallization as described above and recycled to the dissolution step.

The electrolyte obtained upon removal of mercury from the alloy-containing aqueous solution contains dissolved chlorides in addition to the alloy values. In order to provide a non-corrosive feed solution for radiochemical separation processes this chloride-bearing solution may be converted to the nitrate form, with the chlorides being removed. Although the method of removing chlorides from the electrolyte is not critical, it is preferred to add nitric acid and distill the resulting solution to volatilize the chlorides in the form of hydrogen chloride gas. Further details of this method of chloride removal may be seen by reference to U.S. Patent No. 2,919,972, entitled "Removal of Chloride From Aqueous Solution," issued January 5, 1960, to Marshall L. Hyman and Jouko E. Savolainen. In the application of this method it is preferred to add an equal volume of 12 to 15 molar nitric acid solution to the electrolyte containing the chlorides and distill the resulting solution. Chlorides may be removed by this means to an acceptable level of under 300 parts per million.

During the chloride-removal step small amounts of an insoluble precipitate may be formed, depending on the particular constituents of the dissolved alloy. Niobium and, to a lesser extent molybdenum, form insoluble hydrous oxides under these conditions and varying amounts, e.g., 3 to 20 percent of the fission product activity follows these precipitates. We have found, however, that only an insignificant amount of uranium, i.e., up to approximately 0.1 percent, is lost to the precipitate. The precipitate formed in this step may be readily removed by any conventional means such as filtration or centrifugation.

The nitrate solution obtained upon removal of chlorides is suitable for use as a feed solution for radiochemical separation processes. The feed concentration is adjusted, depending on the particular alloy constituents and the separation process involved. For zirconium-bearing solutions, a nitric acid concentration over approximately 7 molar is preferred in order to extract the zirconium into the organic phase along with the uranium.

Any conventional equipment resistant to the acidic media and chlorides which are in contact with that equipment may be employed in the method of our invention. We have found that glass-lined steel and nickel-base alloys available commercially under the trade name "Hastelloy" may be employed for the dissolution and alcohol removal steps. A more resistant material such as titanium is required for the chloride-removal step, in which both chlorides and nitrates are present at boiling temperatures.

My invention is further illustrated by the following specific examples.

EXAMPLE I

A nuclear reactor fuel element section (1.3 x 1.3 x 0.5 cm.) weighing 6.5 grams and comprised of 12.9 percent uranium, 84.4 percent zirconium and 2.7 percent niobium was irradiated for one week at a neutron flux of $10^{12}$ neutrons per square centimeter per second and allowed to decay for one week. The decayed section contained fission product activity to the extent of approximately $6 \times 10^9$ total gamma counts per minute. The section was suspended in a solution comprising 136 ml. of solution containing 65 grams of mercuric chloride in anhydrous ethanol. The alloy section dissolved completely at the solution boiling point in one and one-third hours. The dissolver slurry was allowed to stand overnight and was then converted to an aqueous system by adding water and heating the slurry to distill off the alcohol. The resulting aqueous slurry was introduced into an electrolytic cell provided with a mercury pool cathode and a platinum anode. The electrolyte was slowly agitated and current was applied until all the mercury was converted into one continuous phase. The mercury was then removed by draining from the cell. The mercury-free chloride solution was then converted to a nitrate solution by the addition of an equal volume of 15 molar nitric acid and by heating the solution to boiling to distill off the volatile chlorides. A small amount of an insoluble precipitate appeared in the resulting nitrate solution. The precipitate was removed by filtration. The precipitate was then recovered and analyzed to determine the amount of alloy constituents contained therein. The distribution of fission product activity in the materials removed in the dissolution, alcohol-removal, mercury-removal, and chloride-removal steps and in the product nitrate solution was determined by means of conventional instrumentation. The results obtained may be seen by reference to the following table.

Table I

DISTRIBUTION OF FISSION PRODUCTS AND ALLOY LOSSES IN THE DISSOLUTION OF IRRADIATED FUEL ALLOYS

| | Percent Distribution | | |
|---|---|---|---|
| | | β | γ |
| Dissolution step off-gas | | 0 | 0.000 1 |
| Ethanol removal, distillate | | 0.1 | 0 02 |
| Mercury removal, cathode | | 0.9 | 0.2 |
| Chloride removal, distillate | | 11.3 | 3.5 |
| Product nitrate solution: | | | |
| Insoluble | | 23.0 | 6.2 |
| Soluble | | 64.7 | 90.0 |
| Insoluble uranium loss | 0.082 | | |
| Insoluble zirconium | 0.19 | | |
| Insoluble niobium | 5.2 | | |
| Mercury loss | <0.065 | | |

It may be readily seen from the above table that the uranium loss is kept to an acceptably low level in this method, only 0.082 percent being lost to the insoluble precipitate.

The uranium losses during the other steps are negligible since uranium is not removed under these conditions. It may also be seen that the bulk of the fission product activity remains in the product solution and insoluble precipitate, although a substantial portion is removed in the chloride removal distillate.

EXAMPLE II

Four specimens of fuel element alloys of varying composition were dissolved and converted to an aqueous nitrate system by the method of Example I. The insoluble precipitate which formed upon removal of chlorides in this procedure was analyzed to determine the amount of alloy constituents contained. The results obtained are listed in the following table.

Table II

LOSSES OF ALLOY CONSTITUENTS TO INSOLUBLE PRECIPITATES IN MERCURIC CHLORIDE-ETHANOL DISSOLUTION

| Alloy Composition | Percent Contained in Insoluble Precipitate | | |
|---|---|---|---|
| | U | Zr | Nb |
| 93.5% U, 5.0% Zr, 1.5% Nb | 0.0055 | 0.65 | 99 |
| 90% U, 10% Nb | 0.07 | | 98.5 |
| 97.9% U, 2.1% Mo | 0.005 | | |
| 90% U, 10% Mo | 0.0042 | | |

It may be seen from Table II that uranium losses are low for a variety of alloy compositions in the method of our invention.

The above examples are not to be understood as limiting the scope of our invention, which is limited only as indicated in the appended claims.

Having thus described our invention, we claim:

1. The method of dissolving an alloy consisting of uranium and at least one metal in the group consisting of zirconium, thorium, molybdenum and niobium in an aqueous solution which comprises contacting said alloy with an anhydrous solution of mercuric chloride in a low-molecular-weight monohydric alcohol whereby said alloy is dissolved and a mercury-containing alcohol slurry is formed, converting said alcohol slurry to an aqueous slurry, electrolyzing the resulting aqueous slurry in the presence of a mercury cathode until the mercury values in said aqueous slurry are transformed into a metallic phase and separating said metallic phase from the resulting mercury-depleted solution.

2. The method of dissolving an alloy consisting of uranium and at least one metal in the group consisting of zirconium, thorium, molybdenum and niobium in an aqueous solution which comprises contacting said alloy with an anhydrous solution of mercuric chloride in a lowmolecular-weight monohydric alcohol whereby said alloy is dissolved and a mercury-containing alcohol slurry is formed, adding sufficient water to said alcohol slurry to contain the resulting dissolved alloy values in aqueous solution, removing said alcohol from the resulting mixture, electrolyzing the resulting aqueous slurry in the presence of a mercury cathode until the mercury values in said aqueous slurry are transformed into a metallic phase and separating the resulting mercury-depleted solution from said metallic phase.

3. The method of claim 2 wherein said alcohol is selected from the group consisting of ethanol, methanol and combinations of methanol and ethanol.

4. The method of converting an alloy consisting of uranium and at least one metal in the group consisting of zirconium, thorium, molybdenum and niobium into dissolved form in an aqueous nitrate solution which comprises contacting said alloy with an anhydrous solution of mercuric chloride in a low-molecular-weight alcohol whereby said alloy is dissolved and a mercury-containing alcohol slurry is formed, adding sufficient water to said alcohol slurry to contain the resulting dissolved alloy values in aqueous solution, removing said alcohol from the resulting mixture, electrolyzing the resulting aqueous slurry in the presence of a mercury cathode until the mercury values in said aqueous slurry are transformed into a metallic phase, separating the resulting mercury-depleted solution from said metallic phase, adding sufficient nitric acid to said solution to provide a nitric acid concentration of at least 8 molar and heating said solution until the volatilization of chlorides from said solution is substantially completed.

5. The method of claim 4 wherein said alloy is subjected to neutron irradiation prior to dissolution.

6. The method of claim 4 wherein said metallic mercury phase is contacted with gaseous chlorine in an aqueous medium, the mercuric chloride formed thereby is recovered, said mercuric chloride is dissolved in a low-molecular-weight monohydric alcohol and the resulting solution is contacted with said alloy.

7. The method of removing zirconium-base alloy cladding containing a minor proportion of tin and less than one weight percent of at least one metal in the group consisting of iron, nickel and chromium from a uranium dioxide nuclear reactor fuel element clad with said alloy which comprises contacting said fuel element with an anhydrous solution of mercuric chloride in a low-molecular-weight monohydric alcohol whereby said alloy cladding is selectively dissolved.

References Cited in the file of this patent
UNITED STATES PATENTS
2,901,343    Peterson _____ Aug. 25, 1959